US005842556A

United States Patent [19]

van Hattum

[11] Patent Number: 5,842,556

[45] Date of Patent: Dec. 1, 1998

[54] DEVICE FOR SORTING GOODS

[75] Inventor: Ernestus J. M. van Hattum, Haarlem, Netherlands

[73] Assignee: Promech Sortings Systems B.V., Netherlands

[21] Appl. No.: 642,611

[22] Filed: May 3, 1996

[30] Foreign Application Priority Data

May 8, 1995 [NL] Netherlands ............................ 1000315

[51] Int. Cl.$^{6}$ ...................................................... B65G 47/46

[52] U.S. Cl. ........................................ 198/370.05; 198/704

[58] Field of Search ................................ 198/370.05, 704; 209/912

[56] References Cited

PUBLICATIONS

Netherlands Published Application #NL,A,9 001 116, Catharina Afien Geerts, published Dec. 2, 1991.

Netherlands Published Application #NL,A,9 300 633, Speciaal Machinebouw Apeldoorn B.V., published Nov. 1, 1994.

*Primary Examiner*—Joseph E. Valenza

*Attorney, Agent, or Firm*—Frost & Jacobs LLP

[57] ABSTRACT

Device for sorting goods, comprising a stationary frame which is provided with guide means forming an endless path for a number of carriages supported by the guide means and movable along said path. Each carriage is provided with at least one tiltable goods carrier. The frame is provided with a closing guide rail which is placed along the path of the carriages and, viewed in the direction of movement of the carriages, is at a decreasing distance from the path of the tilting shafts of the passing carriages. The goods carrier is provided with a control element which comes into contact with the closing guide rail, for the purpose of tilting the goods carrier upwards out of the second position into the first position. The control element forms several contact points which come into contact with the closing guide rail in succession while the closing guide rail is being passed, in such a way that the distance between the tilting shaft of the goods carrier concerned and the contact point of the control element which is in contact with the closing guide rail decreases while the closing guide rail is being passed.

1 Claim, 2 Drawing Sheets

3
4
5
6
6
7
8
9
10
10
11
12
13
13
14
15
16
21
25
26
27
V

DEVICE FOR SORTING GOODS

BACKGROUND OF THE INVENTION

The present invention relates to a device for sorting goods, comprising a stationary frame which is provided with guide means for forming an endless path for a number of carriages. From NL 9001116 such a sorting device is known wherein each carriage is provided with a conveyor tray formed by two goods carriers. Both goods carriers, each of which in this case forms a tray half, are selectively tiltable about a tilting shaft extending essentially perpendicular to the path of the carriage, between a first position, in which goods can be placed on the conveyor tray formed by the two tray halves, and a downward tilted second position, in which the goods fall down out of the opened conveyor tray. The frame of the known device, which is set up in a stationary position, is provided with a closing guide rail which is disposed along the path of the carriages and, viewed in the direction of movement of the carriages, is at a decreasing distance from the path of the tilting axes of the passing carriages. Of the two tray halves of a carriage, the tray half lying behind, viewed in the direction of advance of the carriage, is provided with a control arm. In the second position of this rear tray half, during the advance of the carriage the control arm comes into contact with the closing guide rail by means of a contact point of said arm formed by a projection provided at right angles on said arm. Through the interaction with the closing guide rail of the frame, the control arm makes the rear tray half connected thereto tilt upwards out of the downward directed second position to the first position. As regards this rear tray half, viewed in the direction of advance of the carriage, the centre of gravity of the rear tray half lies downstream of the tilting axis of said rear tray half.

There is a desire to increase the capacity of the device by increasing the speed of advance of the carriages thereof. In the case of the known device, when the speed of advance of the carriages is increased, the problem arises that tilting the rear tray halves upwards to the first position produces a very great noise nuisance.

Furthermore, in the case of the known device the control arm in the second position of the rear tray half is virtually at right angles to the closing rail, in order in this way to make optimum use of the possible tilting angle of the tray half for moving apart the tray halves and clearing an opening through which the product falls. At a highly increased speed the problem then occurs that on the first contact between the control arm and the closing rail, the closing rail produces a jolt on the control arm—and thus on the carriage—which is directed virtually at right angles to the direction of advance of the carriage. The direction of said jolt is virtually in the direction of the tilting shaft of the tray half concerned and produces a very unfavourable load on the construction. There is also the risk that, due to imbalance of the carriages, a control arm, even before it comes into contact with the closing rail, will assume an angular position which is further forward than is permissible. Due to this position, the problem then occurs that if this arm tilts backwards again, the arm is bound to force the carriage out of its path, with the result that the device jams and is damaged.

OBJECTS OF THE INVENTION

The object of the present invention is to eliminate the abovementioned disadvantages and to provide a sorting device with increased capacity.

SUMMARY OF THE INVENTION

The present invention provides a device for sorting items having increased capacity without an accompanying increase in noise. The control element forms several contact points which come into contact with the closing guide rail in succession while the closing guide rail is being passed, the contact points of the control element being positioned such that the distance between the tilting axis of the goods carrier concerned and the contact point of the control element which is in contact with the closing guide rail decreases while the closing guide rail is being passed. The control element can form several distinct contact points situated at a distance from each other, so that the distance between the contact point which is in contact with the closing guide rail and the tilting axis of the goods carrier changes stepwise, or the points of contact form a continuous contact face, so that this distance changes gradually. Through this embodiment of the control arm, it is possible for the point of the control arm which comes into contact with the closing guide rail in the second position of the goods carrier to be placed further back relative to the tilting axis of said goods carrier than in the case of the known device with a single contact point. The jolt directed virtually at right angles to the closing guide rail during the first contact between the closing guide rail and the control arm in that case is not so much in the direction of the tilting axis of the goods carrier concerned, but provides an advantageous tilting moment which makes the goods carrier tilt in the envisaged direction. Due to the presence of one or more contact points which, viewed in the direction of advance of the goods carrier, lie downstream of the rear point of contact of the control arm and are a shorter distance from the tilting axis, it is possible, without adapting the closing guide rail, to execute fully the tilting movement to the first position within the same section of advance path as in the case of the known device.

The tilting movement of this goods carrier while the closing guide rail is being passed can be optimized through a suitably chosen embodiment of the control element connected to the goods carrier.

The present invention also relates to a goods carrier suitable for use in a sorting device according to the invention. For with the measure according to the present invention, already existing sorting devices can be improved by adapting or replacing the goods carriers.

BRIEF DESCRIPTION OF THE DRAWINGS

The invention will be explained in greater detail below with reference to the diagrammatic drawing, in which:

FIG. 3 shows a schematic diagram in vertical side view of the successive movements when the goods carriers of the device shown in FIG. 2 are being moved out of the second position into the first position.

DETAILED DESCRIPTION OF THE INVENTION

Figure 1:
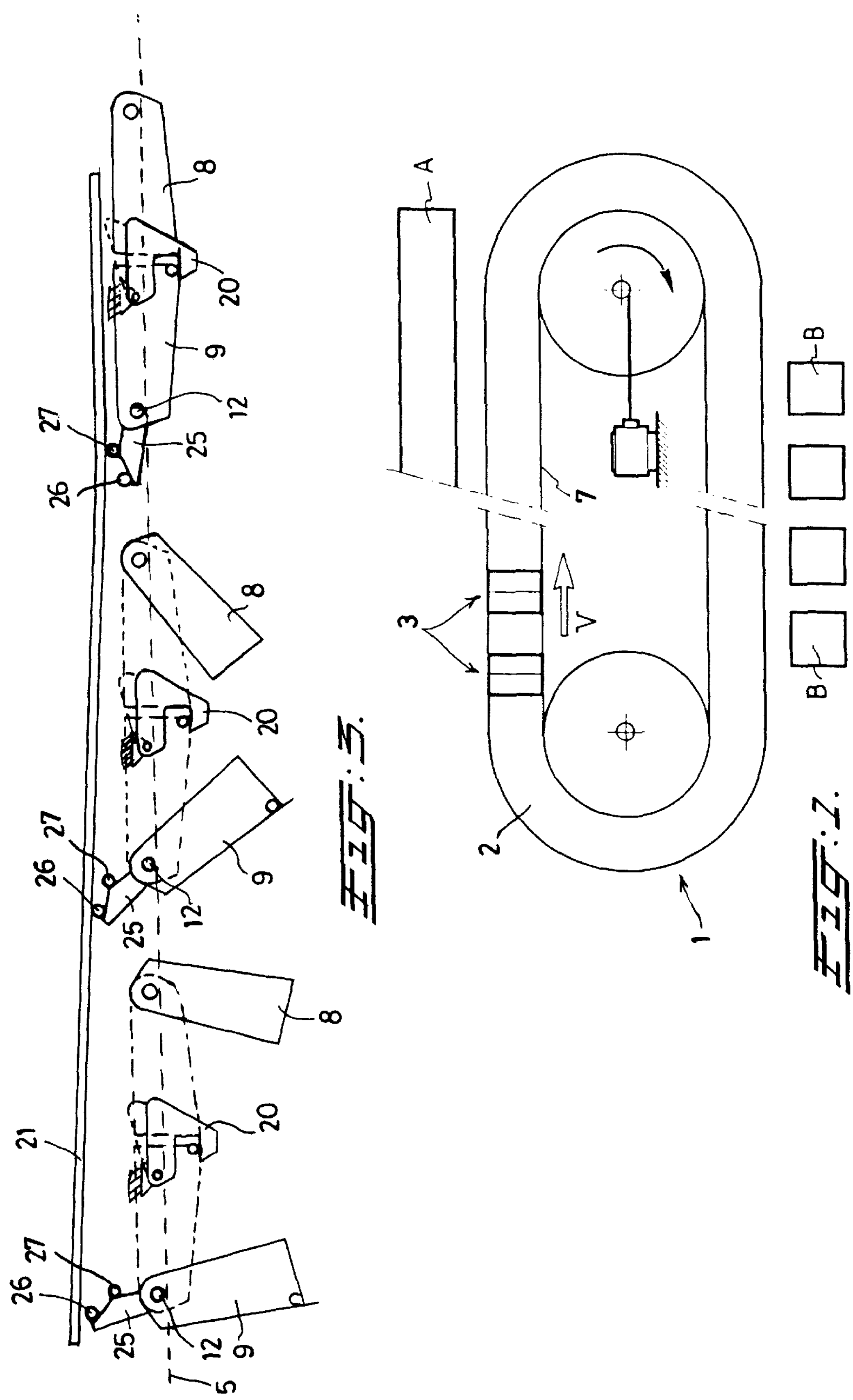
FIG. 1 shows a top view of an exemplary embodiment of a sorting device according to the invention.

Referring to FIG. 1 the device 1 comprises a frame which is to be fixed immovably on the ground and is provided with guide means to be discussed further, which guide means define an endless path 2. FIG. 1 shows a very simple path shape consisting of two straight parts and two connecting bends, but other, more complex path shapes are equally possible. The guide means support a large number of carriages 3 placed behind one another in a chain.

The device 1 can interact with a very diagrammatically shown supply system A for the goods to be sorted, for example packed garments, boxes etc. Delivery stations B are situated at various points along the path 2. The device 1 also comprises a control system, which is not shown in any further detail, and by means of which the goods placed on a particular carriage 3 by supply system A are delivered at the desired delivery station.

Figure 2:
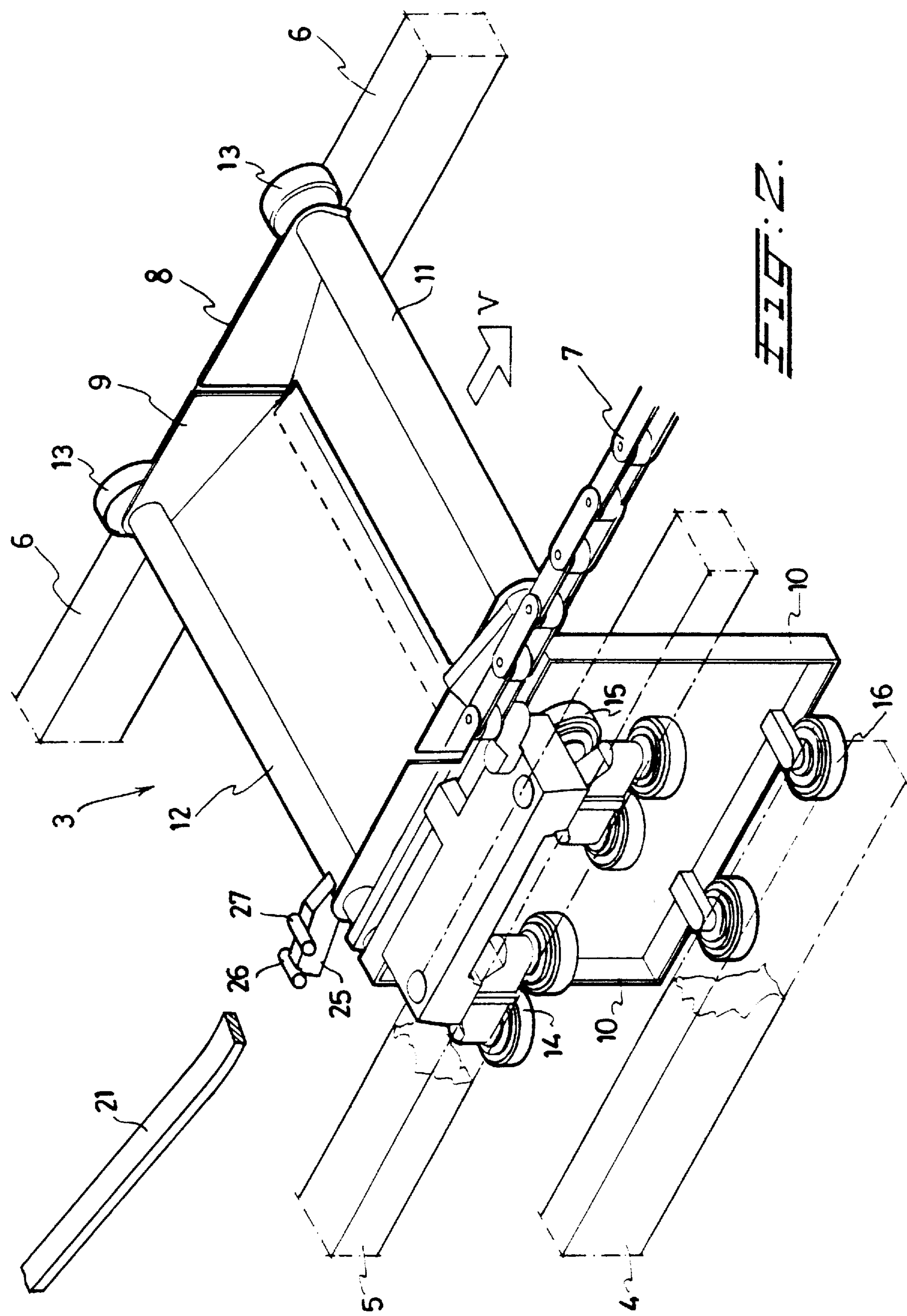
FIG. 2 shows a view in perspective of a part of a sorting device according to the invention.

FIG. 2 shows in greater detail an exemplary embodiment of a carriage of the device 1 according to the invention. The carriage 3 is supported and guided by guide rails 4, 5 and 6, which are fixed in the frame of the device 1. During normal operation all carriages 3 of the sorting device 1 are advanced in common in the direction of arrow V by means of a drive motor (not shown) and the link chain 7, by means of which all carriages 3 are connected.

The carriage 3 has a conveyor tray consisting of two tiltable tray halves 8 and 9, for the conveyance of goods. Such a conveyor tray is also known as a splitting tray. Both tray halves 8, 9 have a bottom and vertical side walls. The tray half 8 is tiltable about a tilting shaft 11 fixed in a frame 10, while the tray half 9 is tiltable in the opposite direction about a tilting shaft 12 situated parallel to the tilting shaft 11 and fixed in the same frame 10. Both tilting shafts 11 and 12 also lie essentially at right angles to the direction of advance of the carriage 3. The carriage 3 rests on the guide rail 6 by means of rollers 13. Sets of rollers 14, 15 and rollers 16 disposed on the frame 10 produce guidance and support of the carriage 3 through the guide rails 4 and 5.

In the position shown in FIG. 2, goods are placed on the tray halves 8, 9 situated in their first position. The tray halves 8, 9 are locked in this first position by a locking hook 20 fitted on the frame 10 of the carriage 3 (see FIG. 3) which is operated by means not shown in any further detail.

For the discharge of goods downwards out of the conveyor tray, the locking hook 20 is operated, so that it assumes its unlocked position. As a result of the position of the centre of gravity of each of the tray halves 8, 9, and due to the weight of the goods carried by the tray halves 8, 9, the two tray halves 8, 9 tilt in opposite directions to each other into the downward tilted second position. Said second position can be seen on the left in FIG. 3. The goods in this case fall through between two tray halves 8, 9 and land in a delivery station B (see FIG. 1).

The present invention relates to moving the rear tray half 9, viewed in the direction of advance of the carriage 3, from this second position into the first position. In order to achieve this tilting movement, the rear tray half 9 is provided with a control arm 25. The frame of the device 1 is provided with a closing rail 21, which at the position of a so-called closing station is placed along the path of the carriages 3, in particular above the path of the control arm 25, such that it comes into contact with the control arm 25 during the advance of the carriage 3. Viewed in the direction of movement of the carriages (arrow V), the closing rail 21, or at least the part thereof with which the control arm 25 first comes into contact, is at a gradually decreasing distance from the plane of advance of the tilting shafts of the passing carriages 3.

The control arm 25 in this exemplary embodiment is provided with two projections 26, 27, which form the contact points of the control arm 25 with the closing rail 21 and successively come into contact with the closing rail 21 when the carriage 3 is passing said rail 21. The projection 26 lies at a greater distance from the tilting shaft 12 than the projection 27. Moreover, the angle between the line through the tilting shaft 12 and the center of gravity of the tray half 9, on the one hand, and the line through the tilting shaft 12 and the projection 26, on the other hand, is greater than the angle between the line through the tilting shaft 12 and the center of gravity of the tray half 9, on the one hand, and the line through the tilting shaft 12 and the projection 27, on the other hand.

The tilting movement of the rear tray half 9 of the device 1 according to the invention will now be explained further with reference to FIG. 3. FIG. 3 shows, in vertical side view from left to right, three successive positions of the tray halves 8, 9 of a carriage passing the closing rail 21 in the direction of arrow V, in the illustration on the left and in the center the position ultimately to be reached also being indicated by dashed lines.

In the illustration on the left, the two tray halves 8, 9 are situated in their second, downward pointing position. In this case the control arm 25 of the rear tray half 9, to which the present invention relates, is projecting upwards. The projection 26, which forms the closing rail contact point of the arm 25 situated furthest from the tilting shaft 12, now is first to come into contact with the closing rail 21. Since the closing rail 21 is placed in the frame of the device 1 in such a way that the underside thereof coming into contact with the control arm 25, viewed in the direction of arrow V, is at a decreasing distance from the path which is defined by the rail 5 of the frame and along which the tilting shaft 12 of the carriage moves, the rear tray half 9 is tilted upwards out of its second position into the first position.

The illustration in the center of FIG. 3 shows the rear tray half 9 when it has already executed a part of this tilting movement. The front tray half 8 has also already executed a part of its tilting movement in the direction of its first position. Said tilting movement of the front tray half 8 is achieved with the aid of means which are not shown in any further detail, for example a rail which is placed below the path of the carriages and along which the bottom edge of the front tray half 8 runs upwards, until the front tray half 8 is in its first position.

When the carriage moves further to the right from the position shown in the illustration in the center, the moment occurs at which both the projection 26 and the projection 27 rest against the closing rail 21. Projection 26 will then move away from the closing rail 21, and only the projection 27 will remain resting against the rail 21. The position shown in the illustration on the right of FIG. 3 will then ultimately be reached, in which position the locking hook 20 locks both tray halves 8, 9 relative to the frame of the carriage.

Through the provision of two projections 26 and 27 on the control arm 25 instead of a single projection as in the case of the known device (the position of this single projection would have been is between the two projections 26 and 27), it is found that the speed of advance of the carriages of the sorting device, and therefore the sorting capacity, can be increased by approximately 80–100% without undesirable increase in the noise of the device, and without the feared jamming of the device occurring.

In an embodiment which is not shown, provision is made for the downward slanting part of the closing rail 21 to run on slightly further than is shown in FIG. 3. In that case the effect obtained is that the tray rear half 9 tilts up past the first position, while the front tray half 8 is locked by the locking hook 20. If the closing rail is provided with a part which connects to the downward slanting part and gradually moves away from the path of the tilting shafts of the tray halves, the rear tray half 9 is made to tilt downwards again and comes to rest in its first position on the already locked front tray half 8. This course of the tilting movement ensures that the two tray halves 8 and 9 are taken reliably and quietly to the first position at very high speeds of advance of the carriages.

The invention is based on the realization that the jolt inevitably occurring during the first contact between the control arm arriving at high speed and the stationary closing rail, which jolt simply becomes greater when the speed of advance of the carriages is increased, must be directed more advantageously relative to the tilting shaft of the goods carrier connected to said control arm than in the case of the known device. The more advantageous direction is preferably not obtained by placing the closing rail at a steeper angle, because that is precisely when a greater component of the jolt is directed in the opposite direction to that of the direction of advance of the carriage, and the carriages are then, as it were, braked with a jolt. However, with the control arm according to the present invention it is possible for the contact point which comes into contact first with the closing rail to be placed further back than in the case of the known device, while in the exemplary embodiment shown the second projection 27 ensures that the same tilting movement is still executed within the same length of path of the carriages. In the case of already existing sorting devices a longer path for this tilting movement is often impossible on account of the absence of space for a longer closing rail.

If the control arm is designed according to the invention, during the passage of the carriage along the closing rail the distance between the tilting shaft of the tray half concerned and the contact point of the control arm of said tray half with the closing rail is smaller (running continuously or stepwise), with the result that the last part of this tilting movement takes place essentially faster than the first part. Therefore, it can be seen in FIG. 3 that if the projection 27 were absent, the tilting movement of the tray half 9 in the illustration on the right would not yet have been completed, and the slanting part of the closing rail 21 would have to be longer in order to complete the tilting movement.

It is clear that the embodiment described above illustrates only one possibility of the control element of the rear tray half. For example, in an embodiment not shown, a curved contact face can be fitted on the arm instead of the two projections, so that the distance between contact point with the closing rail and tilting shaft gradually decreases from the first contact with the closing rail until the tray half has assumed its first position. The control arm can also be provided with moving parts which change the distance between contact point with the closing rail and the tilting shaft depending on the angular position of the tray half concerned.

What is claimed is:

1. A device for sorting goods, comprising a stationary frame which is provided with guide means forming an endless path for a number of carriages supported by the guide means and movable along said path in a direction of movement of said carriages, each carriage being provided with at least one goods carrier which is selectively tiltable about a tilting axis extending essentially at right angles to the path of the carriages, between a first position, in which the goods carrier can carry goods, and a downward tilted second position, in which the goods fall off the goods carrier, the frame being provided with a closing guide rail which is placed along the path of the carriages and which, when viewed in the direction of movement of the carriages extends at a decreasing distance from the path of the carriages, the goods carrier being provided with a control arm rigidly connected thereto which comes into contact with the closing guide rail during the advance of the carriages, for the purpose of tilting the goods carrier upwards out of the second position into the first position, wherein the control arm includes multiple projections which come into contact sequentially with the closing guide rail while the closing guide rail is being passed, the projections on the control arm, when viewed in a plane at right angles to the tilting axis, being situated at various angular positions and distances from the tilting axis of the goods carrier, and further being positioned such that the distance between the tilting axis of the goods carrier concerned and the projection on the control arm which is in contact with the closing guide rail decreases while the closing guide rail is being passed.

* * * * *